United States Patent
Hartsel et al.

(10) Patent No.: US 10,953,344 B2
(45) Date of Patent: Mar. 23, 2021

(54) EXTRACTION SYSTEM

(71) Applicant: Delta Team Holdings LLC, Hilton Head, SC (US)

(72) Inventors: Joshua A. Hartsel, Lake Forest, CA (US); Michael Hartsel, Bluffton, SC (US); Robert F. McPherson, Jr., Okatie, SC (US)

(73) Assignee: DELTA TEAM HOLDINGS LLC, Hilton Head, SC (US)

( * ) Notice: Subject to any disclaimer, the term of this patent is extended or adjusted under 35 U.S.C. 154(b) by 0 days.

(21) Appl. No.: 16/678,073

(22) Filed: Nov. 8, 2019

(65) Prior Publication Data

US 2020/0147516 A1    May 14, 2020

Related U.S. Application Data

(60) Provisional application No. 62/758,326, filed on Nov. 9, 2018.

(51) Int. Cl.
  *B01D 11/02* (2006.01)
  *B01D 1/00* (2006.01)
  (Continued)

(52) U.S. Cl.
  CPC ........ *B01D 11/0207* (2013.01); *B01D 1/0064* (2013.01); *B01D 3/343* (2013.01);
  (Continued)

(58) Field of Classification Search
  CPC ........ B01D 1/0064; B01D 3/343; B01D 3/40; B01D 11/0207; B01D 11/028; B01D 11/0288; B01D 2011/007; C11B 1/10
  See application file for complete search history.

(56) References Cited

U.S. PATENT DOCUMENTS 2,534,341 A    12/1950  Cross
7,259,231 B2 *  8/2007  Cornish ............ B01D 11/0219
                                        528/483

(Continued)

FOREIGN PATENT DOCUMENTS

CN    106085587 A    11/2016
EP      556101 A1     8/1993

OTHER PUBLICATIONS

Hiamdan, et al., "Extraction of Cardamom Oil by Supercritical Carbon Dioxide and Sub-Critical Propane", The Journal of Supercritical Fluids 44 (2008) 25-30.

(Continued)

*Primary Examiner* — Jonathan Miller
(74) *Attorney, Agent, or Firm* — Dinsmore & Shohl LLP

(57) ABSTRACT

In accordance with one or more embodiments of the present disclosure, a computer-controlled programmable logic controller (PLC) extraction system for separating an extract from a biomass includes a PLC, a solvent reservoir comprising a solvent that is a gas when the solvent is at a temperature of 25° C. and atmospheric pressure, a plurality of extraction devices comprising the biomass, an extract collection reservoir for collecting the extract, a solvent recovery system, and a temperature controlled circulation system. The circulation system fluidly connects the solvent reservoir, the plurality of extraction devices, the extract collection reservoir, and the solvent recovery system and comprises at least one apparatus for controlling a flow of the solvent. The solvent comprises no more than 1 weight % $CO_2$. A method of extracting an extract from a biomass using a PLC extraction system is also described.

18 Claims, 17 Drawing Sheets

(51) Int. Cl.
*C11B 1/10* (2006.01)
*B01D 3/40* (2006.01)
*B01D 3/34* (2006.01)
*B01D 11/00* (2006.01)

(52) U.S. Cl.
CPC .............. *B01D 3/40* (2013.01); *B01D 11/028* (2013.01); *B01D 11/0288* (2013.01); *C11B 1/10* (2013.01); *B01D 2011/007* (2013.01)

(56) References Cited

U.S. PATENT DOCUMENTS

| | | | |
|---|---|---|---|
| 9,005,336 | B2 | 4/2015 | Kaneko et al. |
| 9,132,363 | B2 * | 9/2015 | Joseph ............... B01D 11/0284 |
| 9,327,210 | B1 * | 5/2016 | Jones ................ B01D 11/0215 |
| 9,604,155 | B2 | 3/2017 | McGhee |
| 9,649,575 | B2 * | 5/2017 | Hopkins ............ B01D 11/0292 |
| 9,757,664 | B2 * | 9/2017 | McGhee ................. C11B 9/025 |
| 9,790,451 | B2 * | 10/2017 | Martinsen .......... B01D 11/0215 |
| 9,908,063 | B2 | 3/2018 | Joseph |
| 10,000,723 | B2 | 6/2018 | Young et al. |
| 10,035,081 | B2 | 7/2018 | Galyuk |
| 10,053,648 | B2 * | 8/2018 | Ellis ................ B01D 11/0215 |
| 10,159,908 | B2 | 12/2018 | Thomas |
| 10,722,815 | B2 * | 7/2020 | MaHannah .......... B01D 11/028 |
| 2004/0043126 | A1 | 3/2004 | Grewal |
| 2005/0058755 | A1 | 3/2005 | Chambers |
| 2006/0106183 | A1 * | 5/2006 | Cornish ............. B01D 11/0203 528/1 |
| 2011/0034712 | A1 | 2/2011 | Lin |
| 2014/0193303 | A1 * | 7/2014 | Ellis ................... B01D 11/0207 422/119 |
| 2016/0030860 | A1 * | 2/2016 | McGhee ............ B01D 11/0207 422/116 |
| 2016/0091226 | A1 * | 3/2016 | Buese ................ B01D 11/0284 62/115 |
| 2016/0250564 | A1 | 9/2016 | Thomas |
| 2017/0157529 | A1 * | 6/2017 | Chess ................ B01D 11/0203 |
| 2017/0240840 | A1 | 8/2017 | Privitera et al. |
| 2017/0240841 | A1 * | 8/2017 | Ellis ................ B01D 11/0207 |
| 2017/0312327 | A1 * | 11/2017 | Jones ........................ C11B 1/04 |
| 2018/0056211 | A1 * | 3/2018 | Seabrook .................. B04C 9/00 |
| 2019/0134531 | A1 * | 5/2019 | MaHannah ........ B01D 11/0292 |
| 2019/0185783 | A1 * | 6/2019 | Neil .................. B01D 11/0261 |

OTHER PUBLICATIONS

Freitas, et al., "Extraction of Grape Seed Oil Using Compressed Carbon Dioxide and Propane: Extraction Yields and Characterization of Free Glycerol Compounds" J. Agric. Food Chem. (2008) 56, 2558-2564.

Illes, et al., "Supercritical CO2 and Subcritical Propane Extraction of Spice Red Pepper Oil with Special Regard to Carotenoid and Tocopherol Content", Journal of Chromatographic Science, (1999) 37, 345-352.

Gnayfeed, et al., "Supercritical CO2 and Subcritical Propane Extraction of Pungent Paprika and Quantification of Carotenoids, Tocopherols, and Capsaicinoids", J. Agric. Food Chem. (2001) 29, 2761-2766.

* cited by examiner

EXTRACTION SYSTEM

CROSS-REFERENCE TO RELATED APPLICATION

This application claims the benefit of U.S. Provisional Application No. 62/758,326, filed Nov. 9, 2018, the content of which is incorporated herein by reference in its entirety.

BACKGROUND

Field

The present invention is generally directed to extraction of botanical oils. More particularly, the present invention is directed to an extraction system for the extraction of botanical oils.

Background

Botanical oils have many beneficial properties, but extracting them efficiently can be challenging. Liquefied petroleum gas ("LPG") extraction systems have shown promise for efficient oil extraction, but they also exhibit unsatisfactory safety and environmental concerns.

BRIEF SUMMARY

Therefore, an extraction system is needed that will allow for the extraction of botanical oils with favorable safety and environmental profiles.

In accordance with a first aspect, a computer-controlled programmable logic controller (PLC) extraction system for separating an extract from a biomass may comprise a PLC, a solvent reservoir comprising a solvent that is a gas when the solvent is at a temperature of 25° C. and atmospheric pressure, a plurality of extraction devices comprising the biomass, an extract collection reservoir for collecting the extract, a solvent recovery system, and a temperature-controlled circulation system. The circulation system fluidly connects the solvent reservoir, the plurality of extraction devices, the extract collection reservoir, and the solvent recovery system and may comprise at least one apparatus for controlling a flow of the solvent. The solvent comprises no more than 1 weight % $CO_2$.

In accordance with a second aspect, the at least one apparatus for controlling the flow of the solvent is pneumatically controlled.

In accordance with a third aspect, the at least one apparatus for controlling the flow of the solvent is a pneumatically controlled ball valve.

In accordance with a fourth aspect, the solvent is selected from the group consisting of ethane, propane, butane, isobutane, 1,1,1,2-tetrafluoroethane, dimethyl ether, methyl ethyl ether, and a mixture of two or more of these.

In accordance with a fifth aspect, the solvent is propane, butane, isobutane, or a mixture of two or more of these.

In accordance with a sixth aspect, the solvent recovery system may comprise a cooling device thermally coupled to the solvent reservoir and the plurality of extraction devices.

In accordance with a seventh aspect, the PLC is contained in a first compartment and the solvent reservoir, the plurality of extraction devices, the extract collection reservoir, and the solvent recovery system are all contained in a second compartment different from the first compartment, the first compartment and the second compartment being fluidly coupled by the temperature-controlled circulation system.

In accordance with an eighth aspect, the extract collection reservoir may comprise a collection pan for mixing a second solvent with the extract for post-processing and further purification of the extract.

In accordance with a ninth aspect, the plurality of extraction devices may comprise a solvent inlet, the solvent inlet comprising a diffuser.

In accordance with a tenth aspect, the computer-controlled PLC extraction system may further comprise a vacuum fluidly connected to the PLC, the solvent reservoir, the plurality of extraction devices, the extract collection reservoir, the solvent recovery system, and the temperature-controlled circulation system.

In accordance with an eleventh aspect, the computer-controlled PLC extraction system may further comprise an evaporator having an inlet fluidly connected to the plurality of extraction devices and an outlet fluidly connected to the extract collection reservoir.

In accordance with a twelfth aspect, the evaporator may comprise a plurality of evaporation channels arranged from the inlet to the outlet along a major axis of the evaporator.

In accordance with a thirteenth aspect, a method of extracting an extract from a biomass may comprise providing the biomass to a computer-controlled programmable logic controller (PLC) extraction system, circulating the solvent through the temperature-controlled circulation system to produce a mixture of the extract and the solvent, separating the solvent from the extract; collecting the extract; and returning at least a portion of the solvent to the solvent reservoir. The PLC extraction system may comprise a PLC, a solvent reservoir comprising a solvent that is a gas when the solvent is at a temperature of 25° C. and atmospheric pressure, a plurality of extraction devices comprising the biomass, an extract collection reservoir for collecting the extract, a solvent recovery system, and a temperature-controlled circulation system. The circulation system fluidly connects the solvent reservoir, the plurality of extraction devices, the extract collection reservoir, and the solvent recovery system and may comprise at least one apparatus for controlling a flow of the solvent. The solvent comprises no more than 1 weight % CO2.

In accordance with a fourteenth aspect, the method of extracting an extract from a biomass may further comprise purging the PLC extraction system prior to the circulating the solvent.

In accordance with a fifteenth aspect, the purging may comprise applying a purging gas to the PLC extraction system and applying a vacuum to the PLC extraction system.

In accordance with a sixteenth aspect, the purging gas is selected from the group consisting of compressed air, $N_2$, $CO_2$, He, Ar, Ne, Kr, Xe, Rn, and mixtures of two or more of these.

In accordance with a seventeenth aspect, applying the inert gas and the applying the vacuum are each performed more than once.

In accordance with an eighteenth aspect, the method of extracting an extract from a biomass may further comprise testing whether the PLC extraction system can maintain the vacuum.

In accordance with a nineteenth aspect, the method of extracting an extract from a biomass may further comprise deactivating automatically the PLC extraction system if the PLC extraction system cannot maintain the vacuum or if the PLC extraction system detects at least a threshold concentration of hydrocarbons in an environment of the PLC extraction system.

In accordance with a twentieth aspect, the method of extracting an extract from a biomass may further comprise pneumatically controlling the at least one apparatus for controlling the flow of the solvent.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings in which like numerals represent like components and.

DETAILED DESCRIPTION

Figure 1:
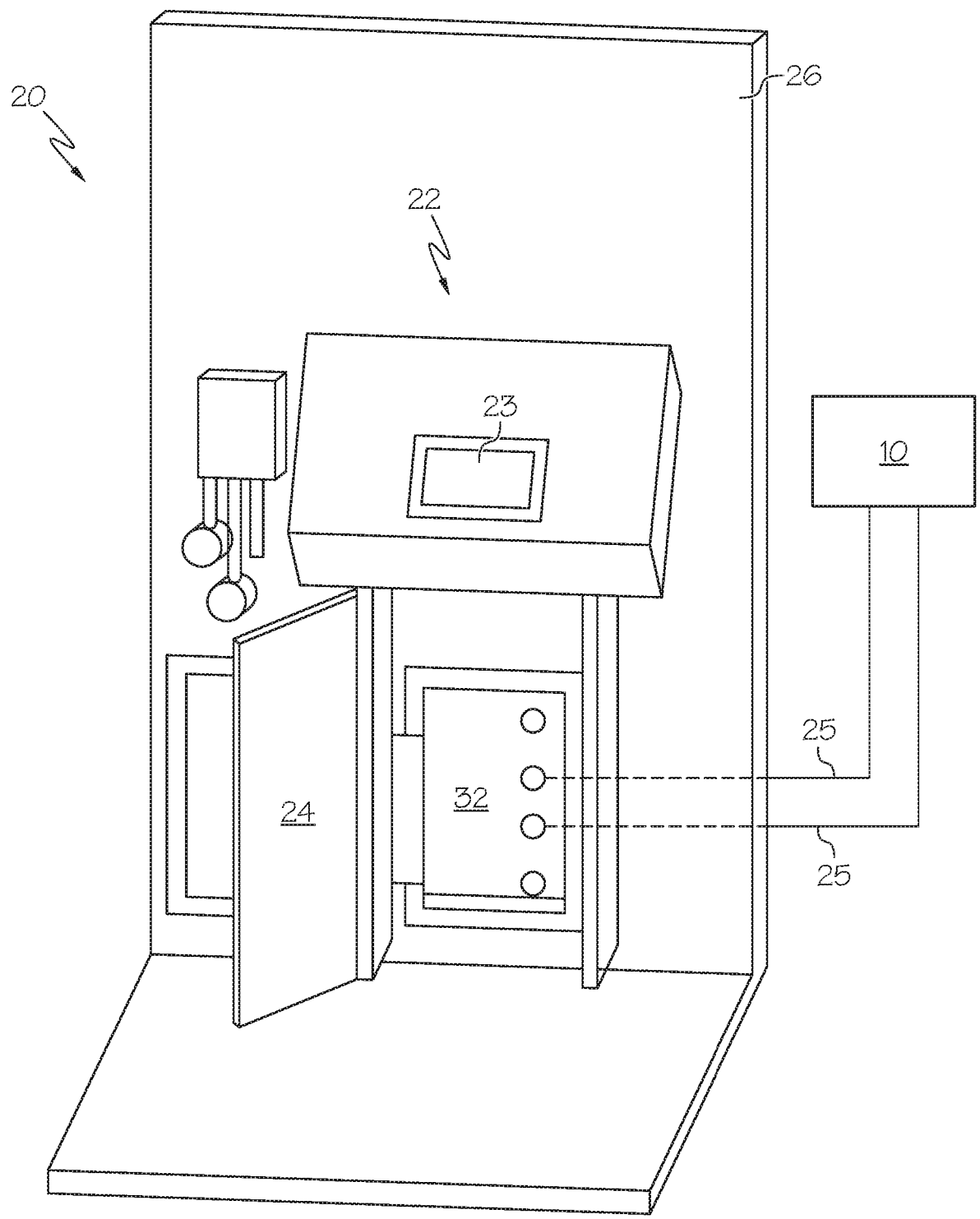
FIG. 1 is a schematic diagram of an embodiment of the PLC extraction system described herein.

Turning to FIG. 1, a computer-controlled programmable logic controller (PLC) extraction system 20 for the extraction of botanical oils may include an extraction system 10 and a PLC computer 22 with user interface 23. In one or more embodiments, the PLC extraction system 20 may also include access panel 24, which allows access to the penetration plate 32 that allows various connections, both electronic and pneumatic, discussed in further detail below between the PLC computer 22 and the extraction system 10. The PLC extraction system 20 can be used for any species of plant that produces botanical oils, including cannabis plants.

The computer-controlled PLC extraction system 20 may be contained in a first compartment and the extraction system 10 may be contained in a second compartment. These first and second compartments may be fluidly coupled by a temperature-controlled circulation system 25 connecting to the PLC computer through the penetration plate 32. For example, and without limitation, the extraction system 10 and the PLC computer 22 may be separated from one another by a partition 26. Partition 26 may be, for example, a wall separating two rooms in a facility, one room housing the extraction system 10 and one room housing the PLC computer 22.

Figure 2:
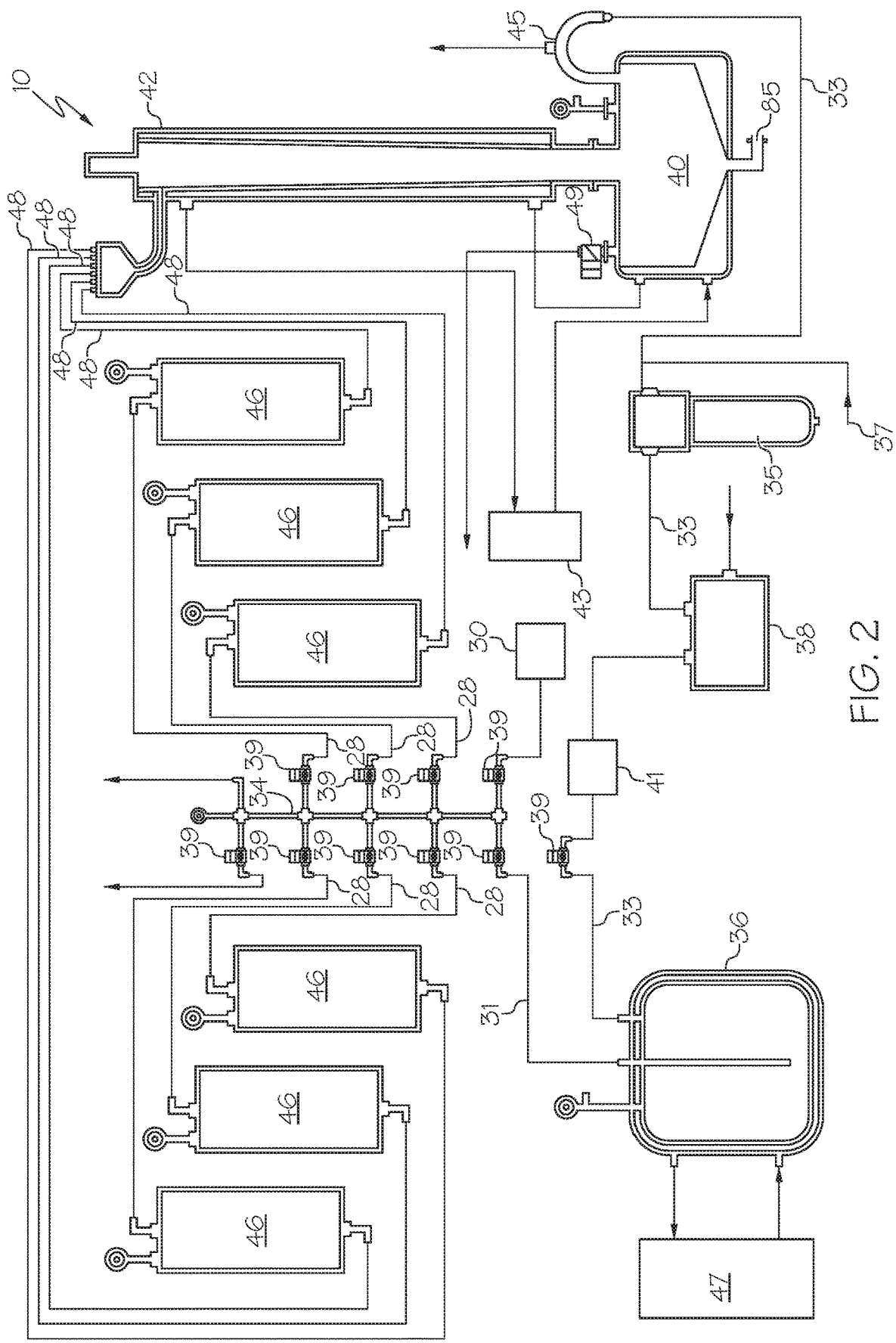
FIG. 2 is a schematic diagram of an embodiment of the PLC extraction system described herein.

Turning now to FIG. 2, the extraction system 10 may include a solvent reservoir 36, a plurality of extraction devices 46, an extract collection reservoir 40 for collecting the extract, a solvent recovery system, and a temperature-controlled circulation system. The solvent recovery system may include a solvent filter 35, a recovery pump 38, a flow interrupter 39, and an aftercooler 41. The circulation system fluidly connects the solvent reservoir 36, the plurality of extraction devices 46, the extract collection reservoir 40, and the solvent recovery system and may include at least one apparatus for controlling a flow of the solvent (i.e., a flow interrupter), described in further detail below.

The solvent reservoir may contain a solvent that is a gas when the solvent is at a temperature of 25° C. and atmospheric pressure. For example, the solvent may be ethane, propane, butane, isobutane, 1,1,1,2-tetrafluoroethane, dimethyl ether, methyl ethyl ether, and a mixture of two or more of these. Additional exemplary solvents include common refrigerants used in the heating, ventilation, and air conditioning (HVAC) industry and non-flammable fluorinated hydrocarbons. In embodiments, the solvent comprises no more than 1 weight % $CO_2$. In embodiments, the solvent is substantially free of $CO_2$. In embodiments, the solvent is free of $CO_2$. As used herein, "substantially free of $CO_2$" describes solvent that contains trace concentrations of $CO_2$ within 100 parts per million ("ppm") of atmospheric concentrations of $CO_2$, or within 50 ppm of atmospheric concentrations of $CO_2$, or within 25 ppm of atmospheric concentrations of $CO_2$, or at atmospheric concentrations of $CO_2$.

Figure 3:
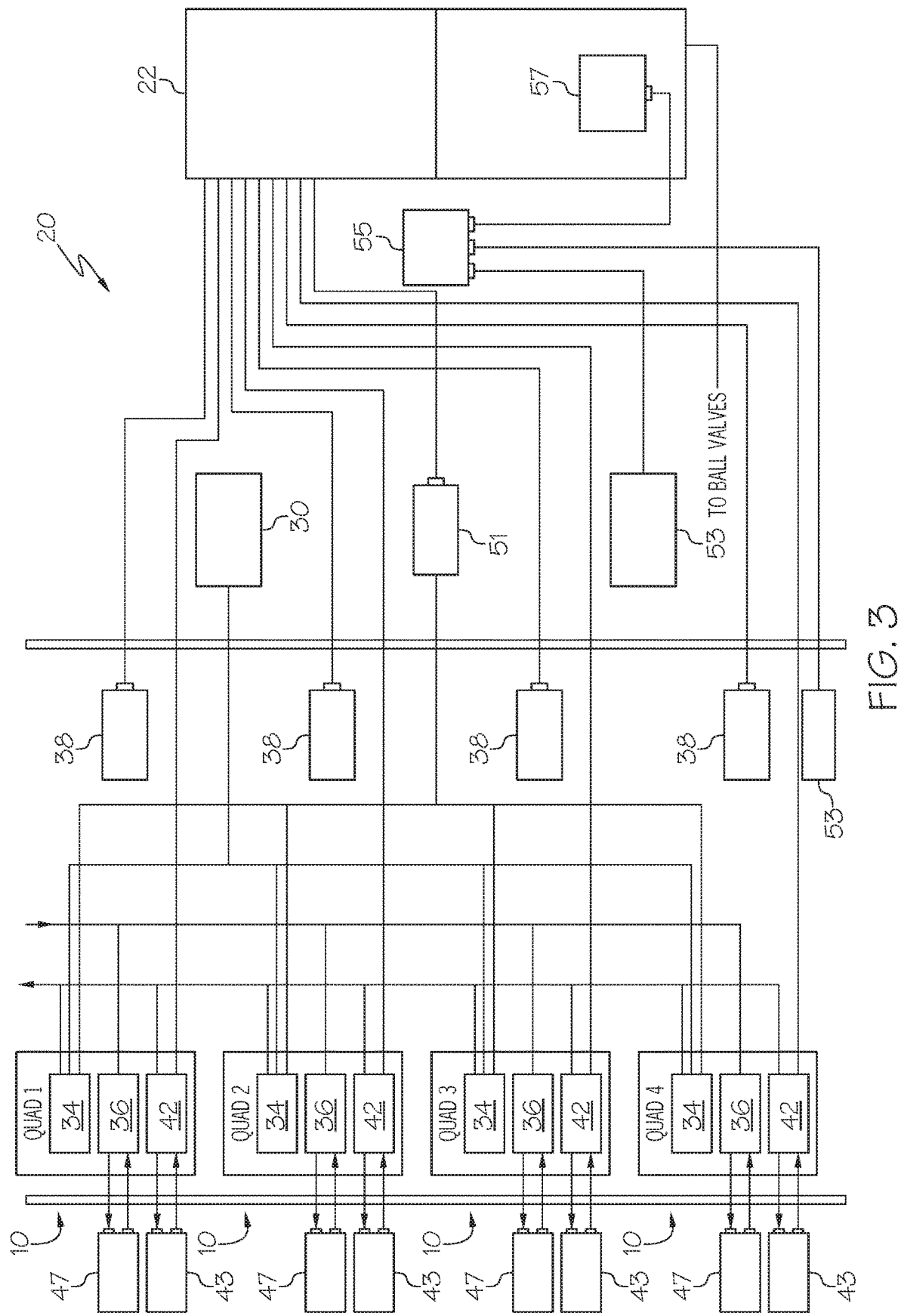
FIG. 3 is a schematic diagram of a multi-quadrant embodiment of the PLC extraction system described herein.

In operation, unused solvent may be added to solvent inlet 37. The solvent then flows through conduit 33 and into solvent filter 35. Recovery pump 38 may be used to encourage the flow of the solvent, and flow interrupter 39 may allow for control of the flow of solvent. For instance, flow interrupter 39 may be valve or stopcock. In one or more embodiments, the flow interrupter 39 may be a pneumatically controlled ball valve. In one or more embodiments, the flow interrupter 39 may be opened and closed using compressed air from an air compressor 30 (as best shown in FIG. 3). In one or more embodiments, the air compressor 30 may be of the oil less or oil free variety. The solvent may continue through conduit 33 into aftercooler 41, which may be used to rapidly decrease the temperature of the solvent, thereby condensing the solvent. The condensed solvent may then travel through conduit 33 to the solvent reservoir 36 and serve as the extraction solvent in the extraction process described below. The solvent reservoir 36 may be chilled with water, propylene or ethylene glycol, and mixtures thereof, or silicone based oils such as Syltherm for low temperature and cryogenic applications from the chiller 47.

Solvent from the solvent reservoir 36 may feed into the manifold 34 through conduit 31. A flow interrupter 39 may control the flow of solvent into the manifold 34, which then distributes solvent to extraction devices 46 through conduits 28. In one or more embodiments, the flow interrupter may be opened and closed using compressed air from an air compressor 30 (as best shown in FIG. 3). The extraction devices 46 contain the biomass from which the extract is extracted. As the solvent passes through the extraction devices 46, the solvent removes soluble materials from the biomass. A mixture of the soluble materials and solvent then exits the extraction devices 46 and flows to an evaporator 42 through conduits 48.

The evaporator 42 may be fluidly coupled to the extract collection reservoir 40. As the mixture of soluble materials and solvent pass into the evaporator 42 and extract collection reservoir 40, which are warmed by water, propylene or ethylene glycol, and mixtures therefore, dibenzyltoluene, or medium chain triglycerides (MCT) from heater 43, the solvent evaporates from the soluble materials. Once the solvent is separated from the soluble materials, the soluble materials are referred to as the "extract," which is collected in the extract collection reservoir 40. The evaporated solvent then exits the extract collection reservoir 40 through outlet 45, into conduit 33, and then into solvent filter 35 to eventually return to solvent reservoir 36.

In one or more embodiments, the heater 43 and the chiller 47 may be combined in a single apparatus. In one or more embodiments, the heater 43 and the chiller 47 may be two separate components. The chiller 47 may be in thermal communication with the extraction devices 46 and the solvent reservoir 36, while the heater 43 may be in thermal communication with the extract collection reservoir 40 and the evaporator 42.

The PLC extraction system 20 may be a closed loop system, meaning that the solvent is recovered into the solvent reservoir 36 after passing through the biomass in an extraction device 46. A pressure sensor 49 may be located on the extract collection reservoir 40, and as the solvent is recovered in the solvent reservoir 36, the pressure in the extract collection reservoir 40 may drop to a set point entered by the operator. Once the set point is attained, the next event is triggered: either extraction of the biomass of the next extraction device 46, or a final recovery if the next extraction device 46 is the last extraction device 46. A final recovery as used herein means substantially all the solvent is recovered back in the solvent reservoir 36 and all extraction devices 46 have undergone extraction by the solvent. The operator may program the PLC computer 22 through user interface 23 regarding the number of extraction devices 46 employed, how many cycles of extraction to perform, the length of time of each extraction, the pressure recovery set points, and many other process variables.

Figure 4:
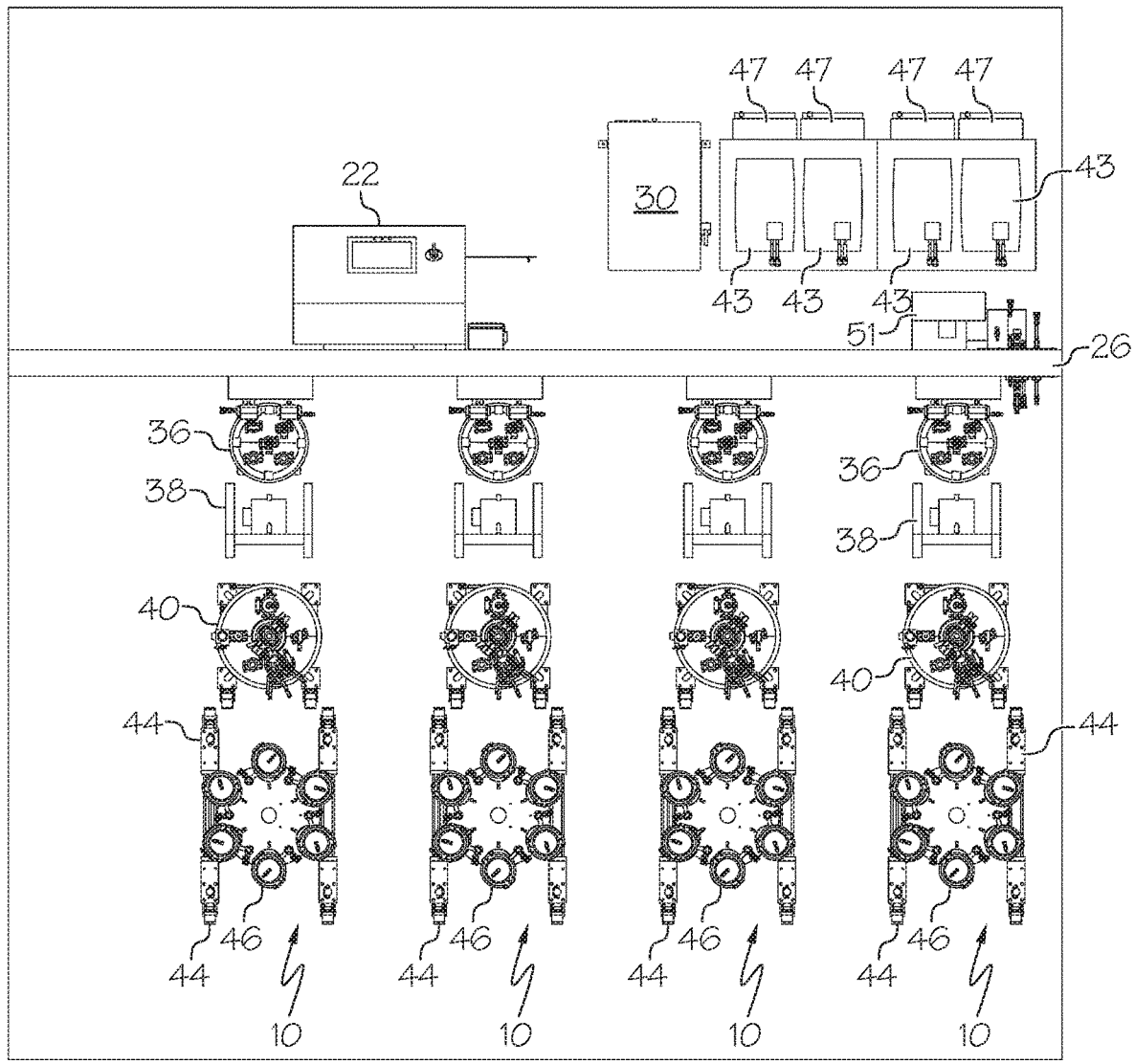
FIG. 4 is a schematic diagram of a multi-quadrant embodiment of the PLC extraction system described herein.

As shown in FIG. 3, the PLC extraction system 20 may be installed in a modular configuration, such that one PLC computer 22 may be used to control multiple parallel extraction systems 10. FIG. 4 illustrates a top view of a PLC computer 22 simultaneously controlling four extraction systems 10 containing, among other components, a solvent reservoir 36, a recovery pump 38, an extract collection reservoir 40, a rotary rack 44 (described in more detail below), and a set of extraction devices 46.

Regardless of the configuration, the PLC computer 22 may use pressure and time set point triggers to control the extraction events. These extraction events include an initial pull of a hard vacuum using a vacuum pump 51, best shown in FIG. 3, to test for leaks in the PLC extraction system 20 and to remove substantially all the molecular oxygen that might be present in the PLC extraction system 20. Additionally, a pulse of a purging gas may be applied to the PLC extraction system 20 to vent any residual solvent present and to pressurize the PLC extraction system 20 to the appropriate pressure set point after the hard vacuum is applied. The purging gas may be, for example, compressed air, $N_2$, $CO_2$, He, Ar, Ne, Kr, Xe, Rn, or mixtures of two or more of these. In one or more embodiments, this application of a vacuum and pulse of purging gas may be performed once or more than once. In one or more embodiments, the purging gas is compressed air supplied from air compressor 30, as shown in FIG. 3. In one or more embodiments, an operator may program the vacuum pressure set point, the time to monitor, and the pressure deviation allowed over that time.

The PLC extraction system 20 may also include a sensor system for detecting solvent escaping from the PLC extraction system 20. The sensor system may include two sensors 53, sensor control module 55, and an independent power source 57. One sensor 53 may be located in the compartment housing the extraction system 10 and the other sensor 53 may be located in a position to monitor the output of the high vacuum source to monitor for any solvent trapped in the extraction system 10 that could be pulled into the vacuum pump. In one or more embodiments, the sensor 53 located near the high vacuum source and the vacuum pump 51 are located in the compartment housing the PLC computer 22. In the event that solvent is detected by either sensor 53, the computer may shut down all electrical components. The sensor system and the computer may be integrated into exhaust fans (not shown), which are activated in the event that a solvent concentration is detected above a safety threshold. In one or more embodiments, the sensor system may be of the lower explosive limit ("LEL") sensor type.

In one or more embodiments, the PLC extraction system 20 may be deactivated automatically if the PLC extraction system 20 cannot maintain the vacuum described above or if the sensor system detects at least a threshold concentration of solvent in an environment of the PLC extraction system 20. In this way, the overall safety of both the environment and the operator may be enhanced.

Figure 5:
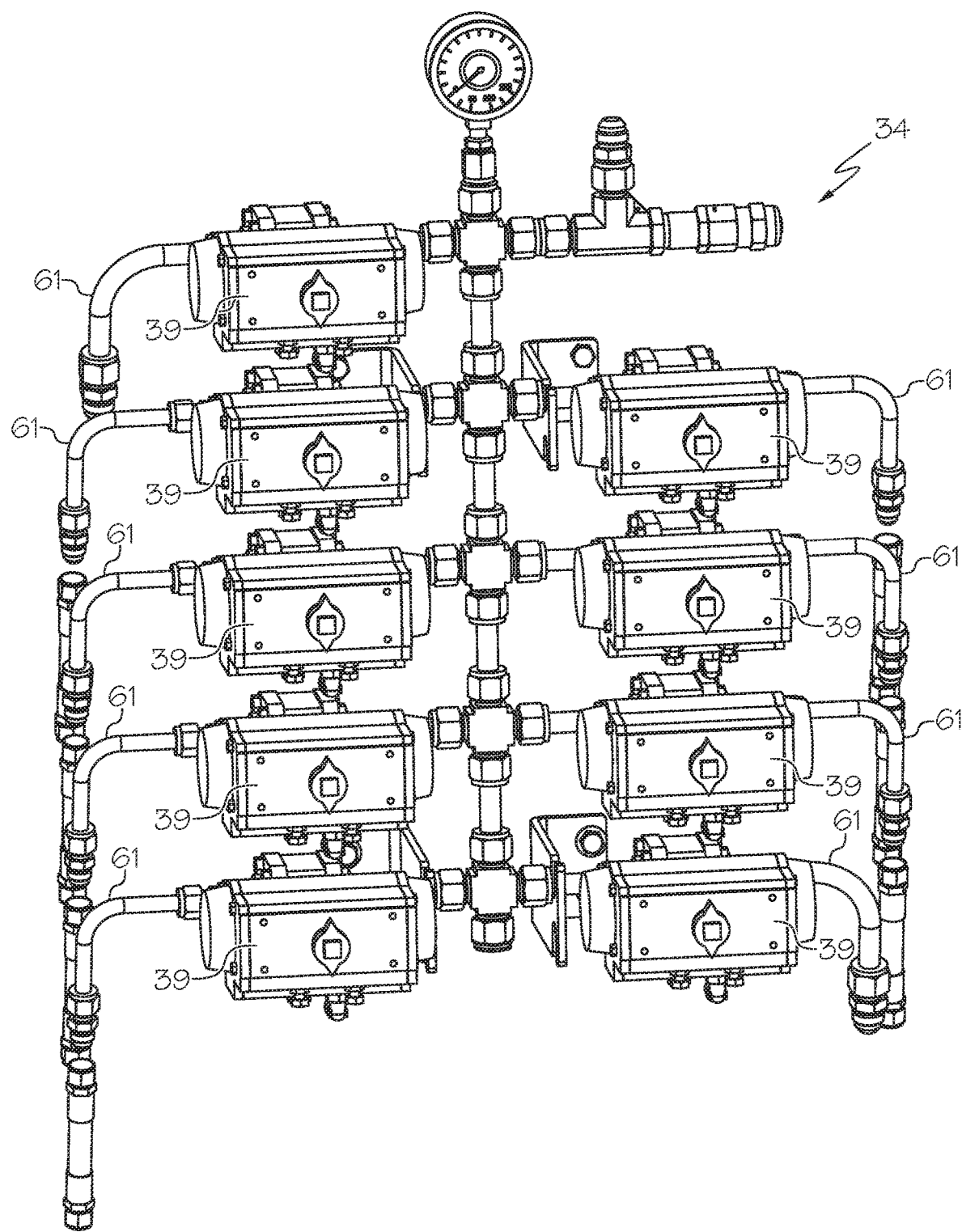
FIG. 5 is a schematic diagram of an embodiment of a manifold as described herein.

FIG. 5 is a detailed schematic view of an embodiment of the manifold 34. The manifold 34 may be wall-mounted, and in one or more embodiments may be mounted to the partition 26. In the embodiment shown, the manifold 34 includes an array of flow interrupters 39. Inlets (not shown) may allow solvent and purging gas into the manifold 34. Each of the flow interrupters 39 in fluid communication with the extraction devices 46 may have an outlet 61 for providing solvent to the extraction devices 46 through conduits 28, as best shown in FIG. 2.

Figure 6:
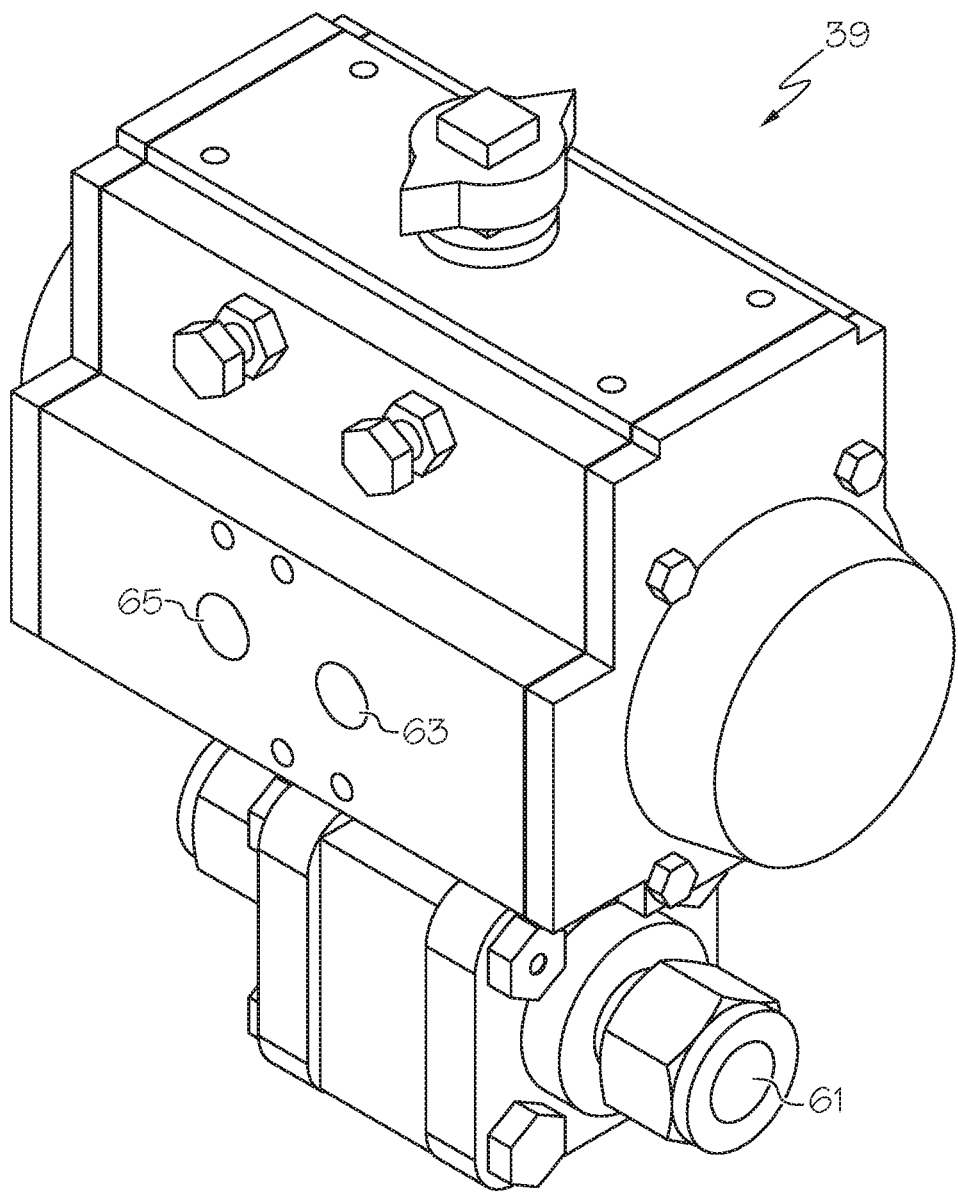
FIG. 6 is a schematic diagram of an embodiment of a flow interrupter as described herein.

In one or more embodiments, the PLC computer 22 delivers compressed air to open and close the flow interrupters 39 in the form of pneumatically controlled ball valves located on the manifold 34. FIG. 6 is a detailed schematic view of a flow interrupter 39 according to one or more embodiments. Flow interrupter 39 includes an air inlet 63 and vent 65. When the flow interrupter is meant to be in a deactivated state, meaning no solvent is meant to flow through the flow interrupter 39, the PLC computer 22 sends a command for air to be applied, the pressure from which closes a barrier within the flow interrupter 39, or the flow interrupter 39 may be normally closed by a spring that is the off position in resting state. When the flow interrupter is meant to be in an activated state, meaning solvent is meant to flow through the flow interrupter 39, the PLC computer 22 sends a command for the flow interrupter 39 to purge its air through the vent 65. The barrier within the flow interrupter 39 then opens, allowing the flow of solvent through the flow interrupter 39.

Pneumatic control may be advantageous because typical electrically actuated flow interrupters can be unsafe in a Class I Division I fire-rated room required for flammable LPG extractions. All states regulate LPG extractions by requiring that the rooms meet electrical and fire codes, and the designation for that rating is Class I Division I. States also require an engineering peer-review (EPR) by an industrial hygienist. Electrically actuated valves can be a source of electrical spark and fire hazard.

The extraction devices 46 may be operated at very low temperatures, e.g. as low as −50° C. or −60° C. or even −100° C. Such low temperatures may allow for very selective extractions and provide pharmaceutical-grade pure isolate crystals. Conventional seals, gaskets, and hoses may fail at these temperatures, however, so in some embodiments, cryogenically stable components may be included in the extraction system 10. For instance, and without limitation, low-temperature, cryogenically stable hoses, gaskets, and seals may be used in the extraction system 10. Hoses may contain conductive cores so as to be grounded throughout the system and dissipate static charge. Gaskets may be made from fluorosilicones that are suitable for low-temperature cryo-applications and also compatible with hydrocarbon solvents. Seals may be food grade, for example sanitary "triclamp" seals, compression fittings, Joint Industry Council fittings flared 37 degrees, and/or American National Standards Institute flanges.

Figure 7A:
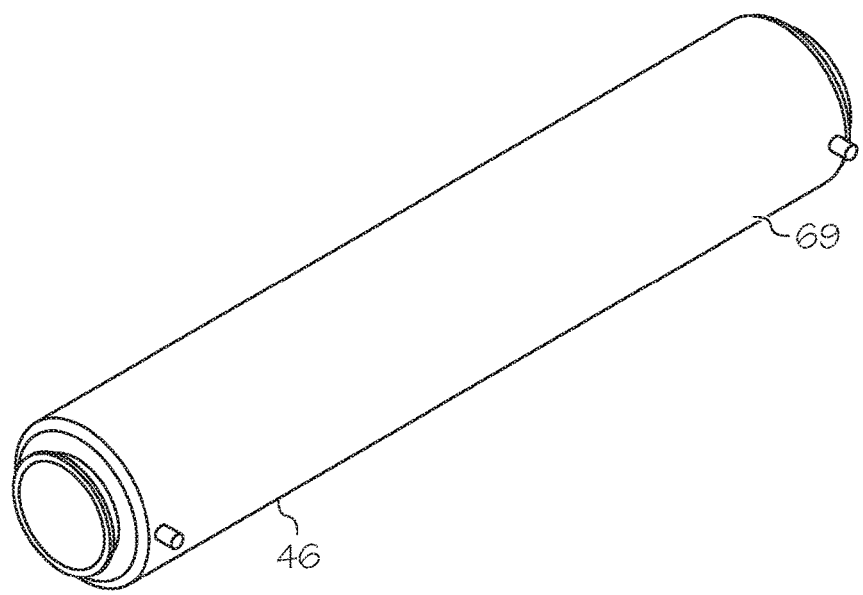
FIG. 7A is a perspective view of a schematic diagram of an embodiment of an extraction device as described herein.
Figure 7B:
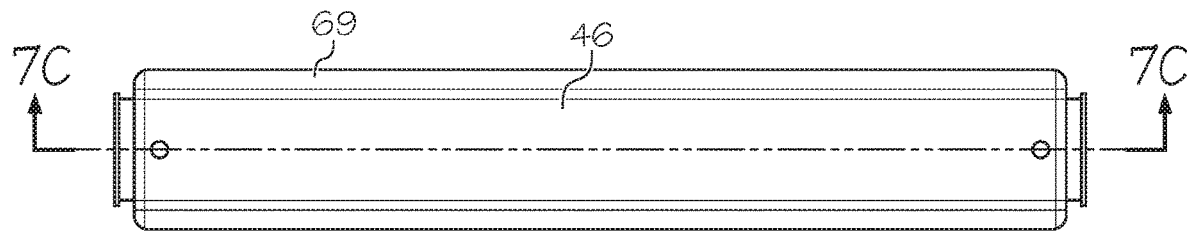
FIG. 7B is a top view of the embodiment of the extraction device of FIG. 7A.
Figure 7C:
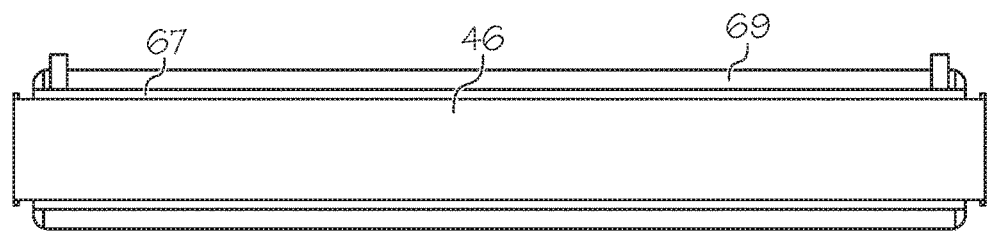
FIG. 7C is a cross-sectional view of the embodiment of the extraction device taken along line 7C-7C of FIG. 7B.

These low temperatures can also cause ice to build up on the outside of the extraction devices 46, eventually causing condensation to accumulate beneath the extraction system 10. FIGS. 7A-7C show an embodiment of the extraction device 46 that may be beneficial in low-temperature extractions. In one or more embodiments, a triple jacket insulation configuration is used to alleviate the issues presented by low-temperature operation. In a triple jacket system, a fluid jacket 67 (best shown in FIG. 7C) may be further insulated with a fiberglass jacket 69 that may inhibit thermal transfer with the exterior of the system and also provide for a more efficient process that minimizes condensate. Little to no sweating or ice buildup is observed when using a triple jacket insulation as described. The triple jacket insulation may also be used on the solvent reservoir 36 for similar reasons.

As outlined above, the PLC extraction system 20 includes an evaporator (e.g., a cyclone evaporator, a falling film evaporator, a tube-in-shell evaporator, or the like) that increases the rate of solvent recovery. Recovery of solvent is generally a rate limiting step and improving the recovery rate can have dramatic effects on production efficiency. The cyclone, falling film, and tube-in-shell evaporators are three separate components that all increase the evaporative surface area. The operator has the option to choose between the three depending on what type of product is desired. In any event, the evaporator 42 is located atop each of the extract collection reservoirs 40 where the extracted botanical oils are collected. The PLC extraction system 20 may be designed such that the cyclone, falling film, and tube-in-shell evaporators 42 are interchangeable.

Figure 8:
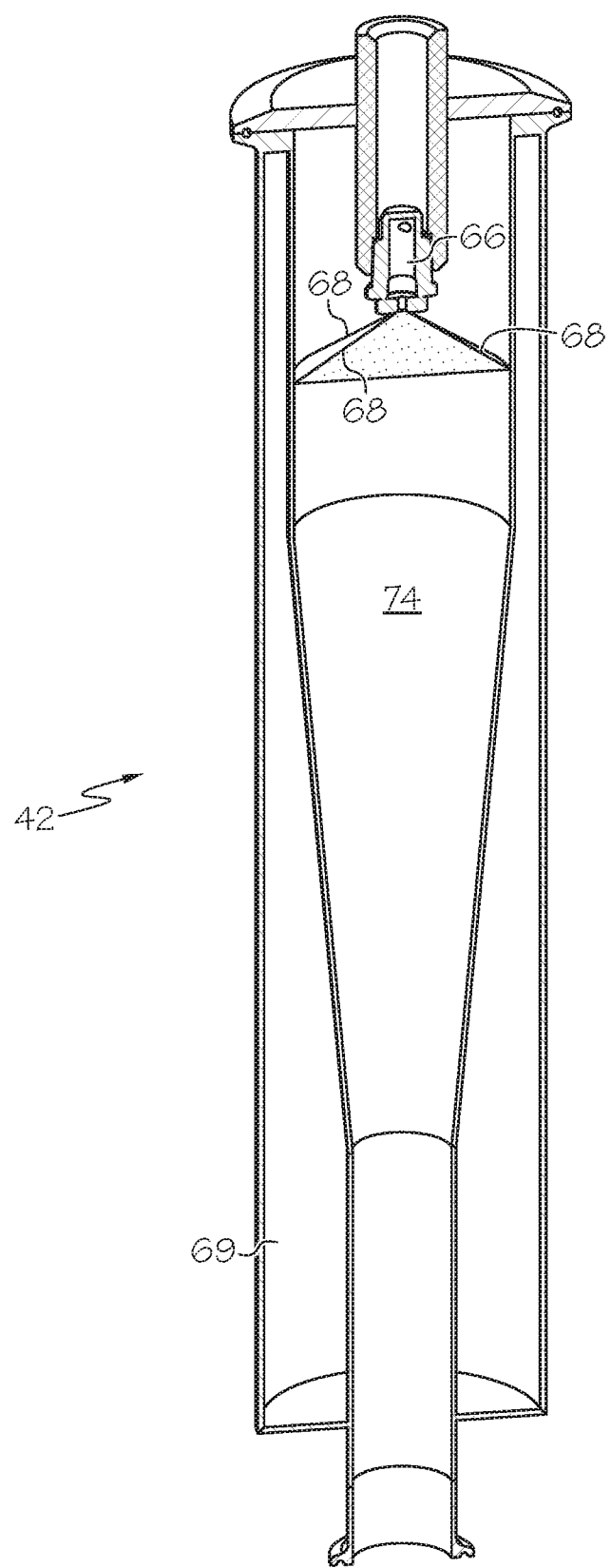
FIG. 8 is a cross-sectional view of a schematic diagram of an embodiment of a falling film evaporator as described herein.
Figure 9:
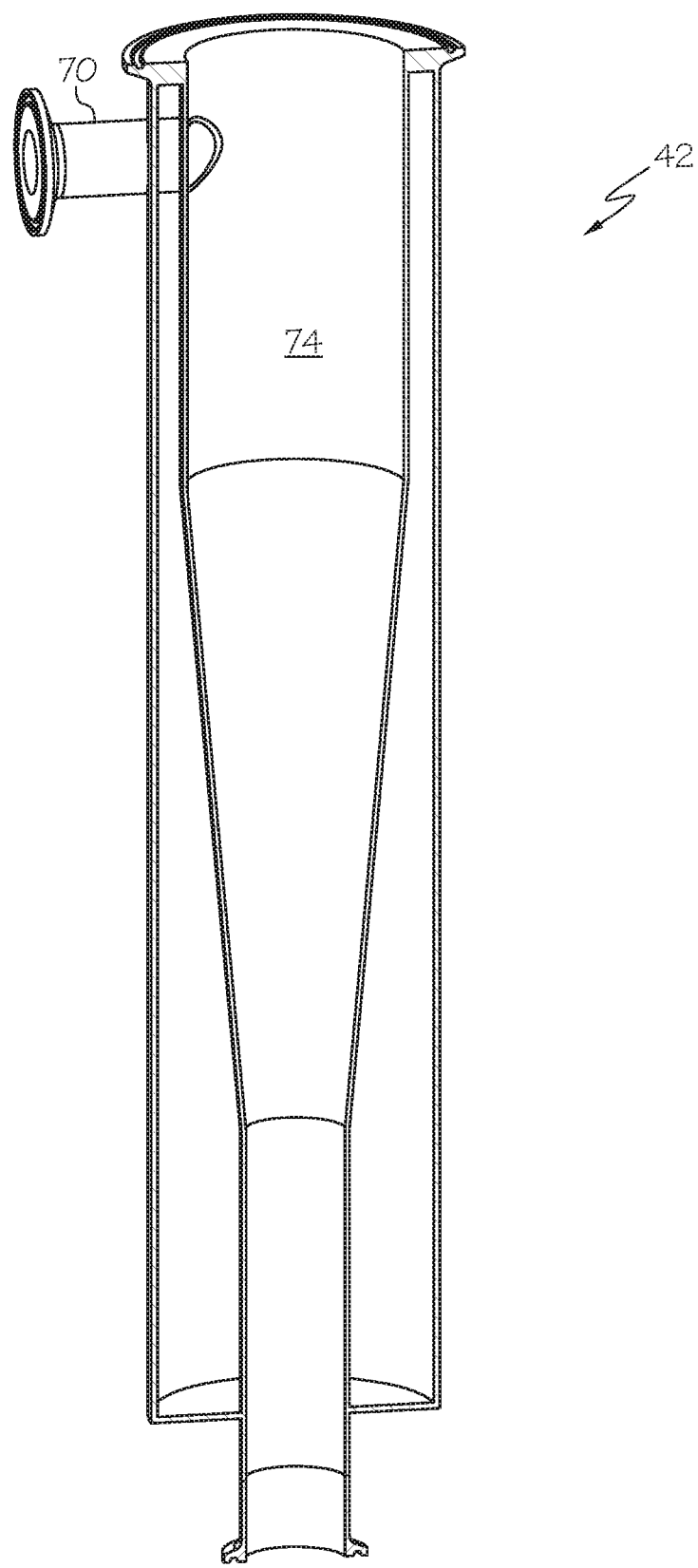
FIG. 9 is a schematic diagram of an embodiment of a cyclone evaporator as described herein.
Figure 10:
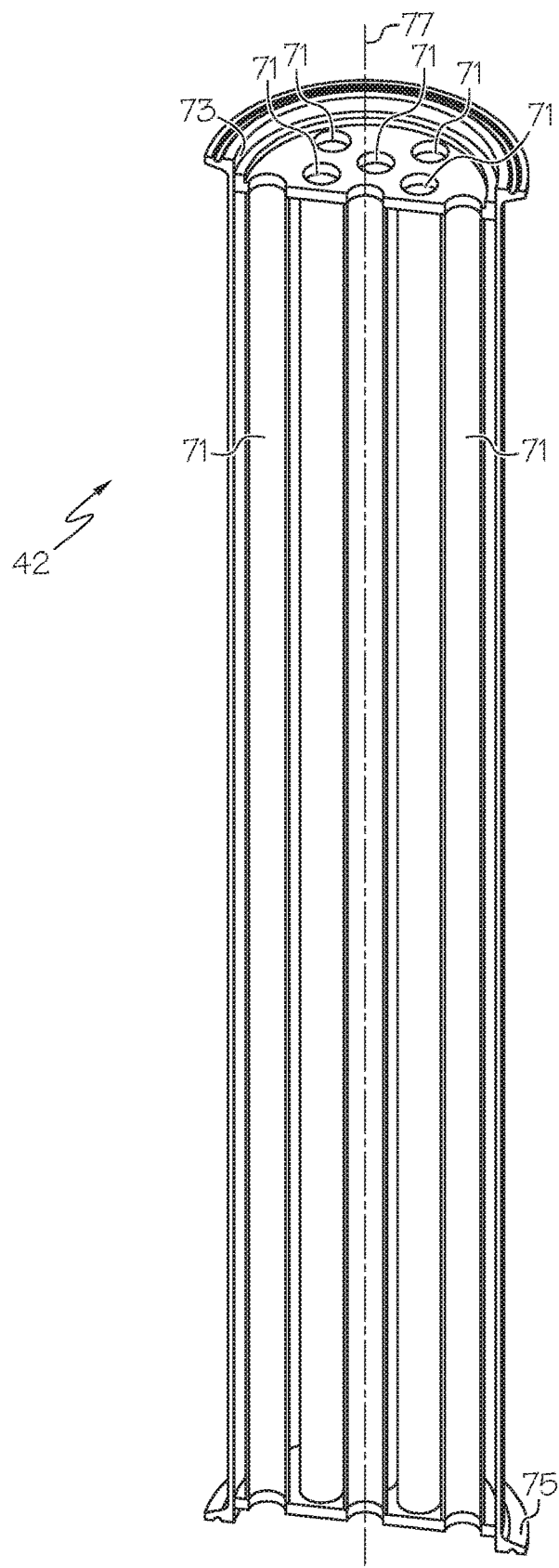
FIG. 10 is a cross-sectional view of a schematic diagram of an embodiment of a tube-in-shell evaporator as described herein.

FIG. 8 illustrates a cross-sectional view of a falling film evaporator 42, FIG. 9 illustrates a cyclone evaporator 42, and FIG. 10 illustrates a cross-sectional view of a tube-in-shell evaporator 42. Falling film and cyclone evaporators operate based on principles known in the art. Regarding the falling film evaporator 42, a nozzle 66 applies the mixture of soluble materials and solvent as a spray 68 into the evaporator. Regarding the cyclone evaporator 42, an inlet 72 applies the mixture of soluble materials and solvent as a stream into the evaporator, and these soluble materials and solvent travel around the interior 74 of the evaporator 42. Along the interior 74 of the evaporator 42, the solvent evaporates from the soluble materials to form the extract. As best shown in FIG. 2, the evaporated solvent then exits the extract collection reservoir 40 through outlet 45, into conduit 33, and then into solvent filter 35 to eventually return to solvent reservoir 36.

A tube-in-shell evaporator 42, as shown in FIG. 10, operates by increasing the available surface area for heating the mixture of the solvent and soluble materials by including a plurality of evaporation channels 71 arranged from an evaporator inlet terminus 73 to the evaporator outlet terminus 75 along a major axis 77 of the evaporator 42. The mixture of the solvent and soluble materials enters through the evaporator inlet terminus 73, and aliquots of the mixture separate into many or all of the evaporation channels 71. In this way, the mixture maintains contact with a larger area of the evaporator surface than if there were no evaporation channels 71.

Regardless of the type of evaporator 42 used, a heating fluid is typically applied to the outside surface of the evaporator 42 from the heater 43. Triple jacket insulation including fiberglass jacket 69, as described above in the context of the extraction devices 46 and solvent reservoir 36, may be used with the evaporator 42 and extract collection reservoir 40 to efficiently maintain the heat within the evaporator 42 and extract collection reservoir 40.

Figure 11:
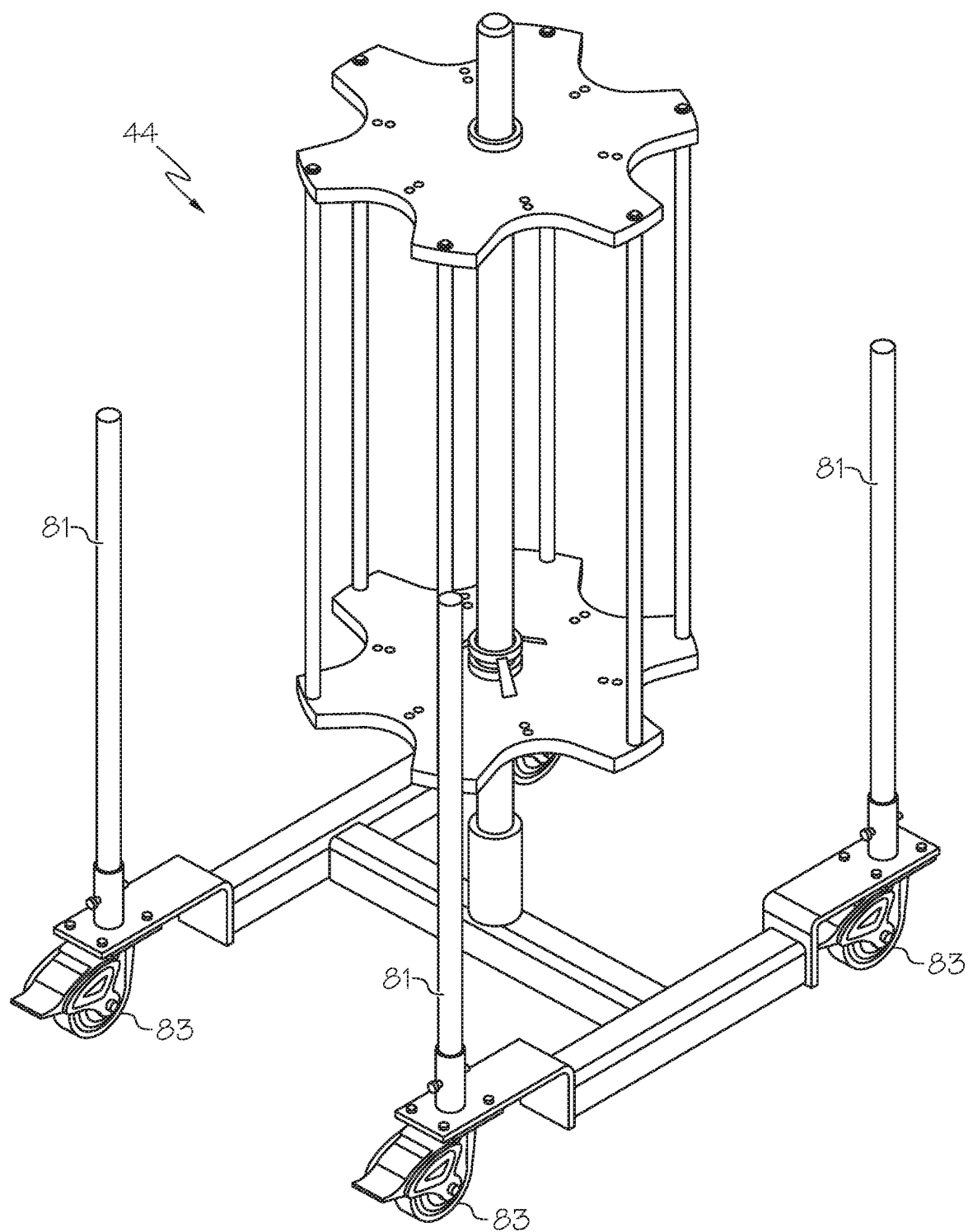
FIG. 11 is a schematic diagram of an embodiment of a rotary rack as described herein.

As shown in FIG. 11, the PLC extraction system 20 may include a rotary rack 44 to house the extraction devices 46. In this manner, filling and unloading of the biomass is simplified because the rotary rack 44 can remain stationary while the extraction devices are rotated from one extraction device to the next. The height of the rotary rack 44 can be adjusted and the operator can work from a centralized catwalk platform. Each of the rotary racks 44 may include four corner poles 81 and caster-type wheels 83 or the like for easy maneuverability.

The PLC extraction system 20 may be designed to be maximize mobility and may incorporate inline downstream processing capabilities. For instance, the extract collection reservoir 40 and, as described above, the extraction device rotary rack 44 may have four point lockable swivel caster-type wheels 83 for easy mobility. The extract collection reservoirs 40 can be moved from the PLC extraction system 20 to post-processing rooms with ease. Further, winterization may be performed in the extract collection reservoir 40 and the contents removed through the extract collection reservoir drain 85 (best shown in FIG. 2). Additionally, components of the PLC extraction system 20 may be designed to meet FDA requirements for food and drug production. The PLC extraction system 20 may also include quick-disconnect fittings on the fluid transfer conduits. More specifically, in one or more embodiments, the fluid transfer conduits of the circulation system of the PLC extraction system 20 may include quick-disconnect fittings. These quick-disconnect fittings allow the operator to disconnect the fluid conduits without leaking fluid on the floor and enable better mobility of the components of the PLC extraction system.

Figure 12A:
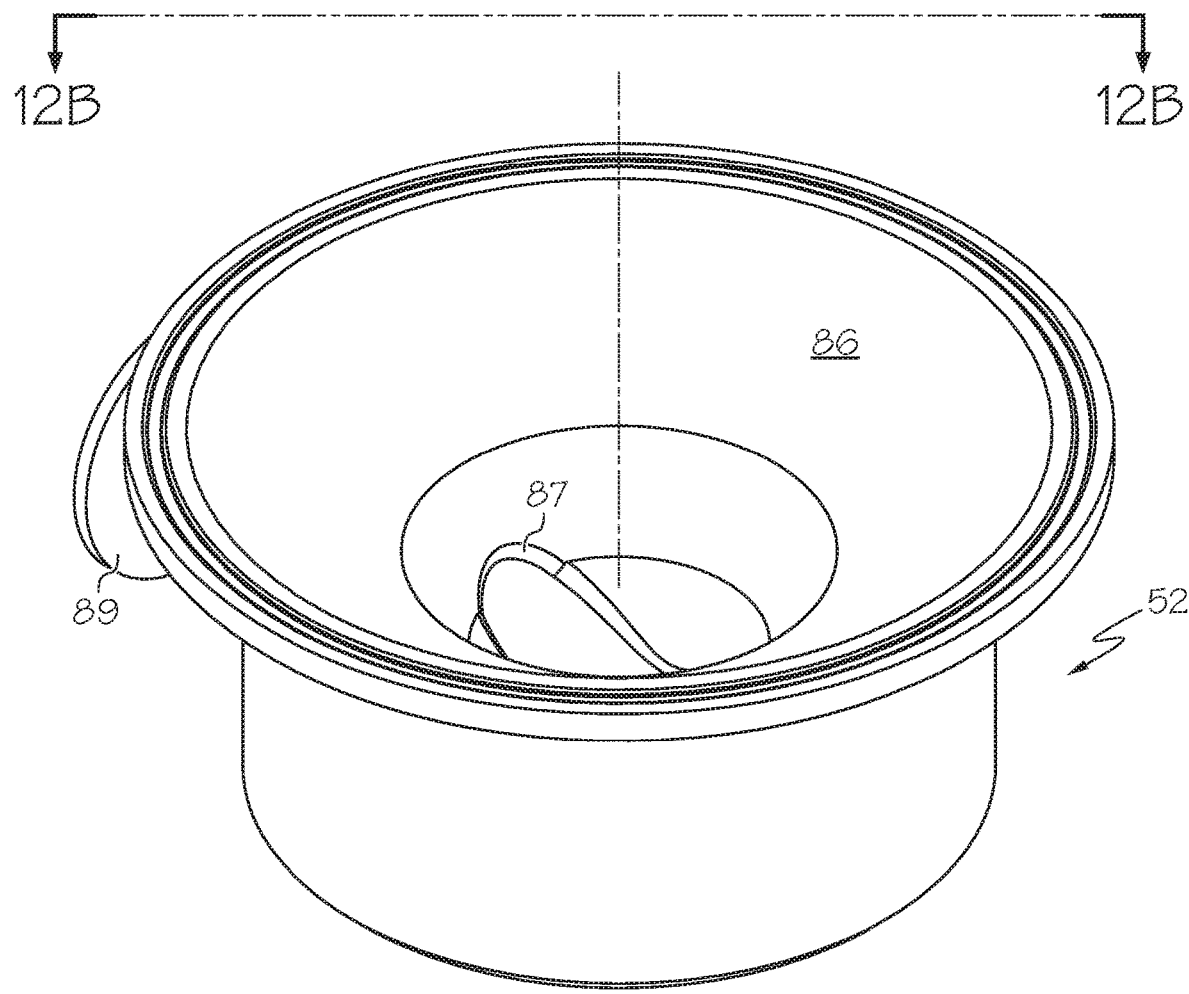
FIG. 12A is a perspective view of a schematic diagram of an embodiment of a collection pan as described herein.
Figure 12B:
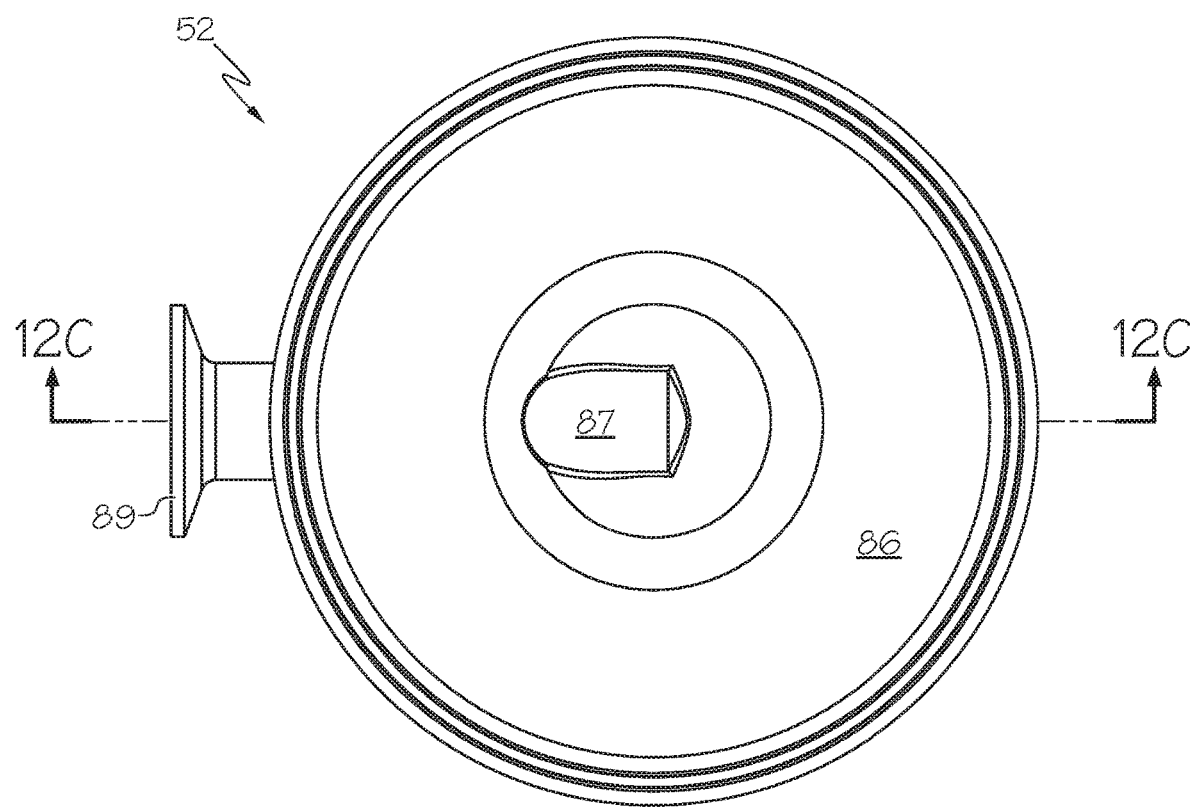
FIG. 12B is a top view of the embodiment of the collection pan of FIG. 12A.
Figure 12C:
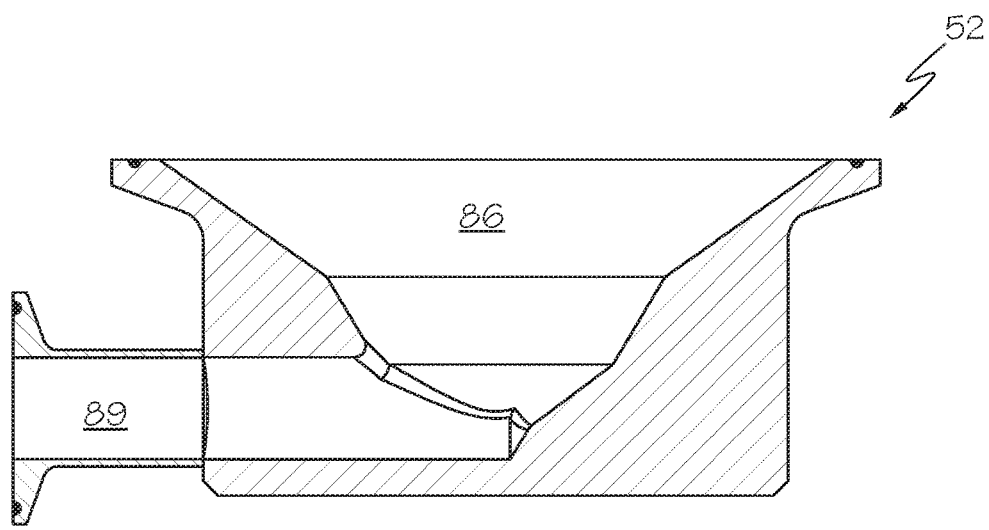
FIG. 12C is a cross-sectional view of the embodiment of the collection pan taken along line 12C-12C of FIG. 12B.

In one or more embodiments, the collection pan 52, as shown in FIGS. 12A-12C, may be used to facilitate draining the extract from the extract collection reservoir 40. The collection pan 52 includes a substantially conical internal wall 86 and ramp 87 that help to funnel the extract to the outlet 89 and into the extract collection reservoir drain 85. Solvents may also be added to the extract collection reservoir 40 to speed this draining process. For example, one or more typical organic solvents such as methanol, ethanol, dichloromethane, tetrahydrofuran, hexane, heptane, acetone, toluene, and the like, may be added to the extract collection reservoir 40 to dissolve or disperse the extract, lowering its viscosity, and allowing more efficient removal of the extract from the extract collection reservoir 40.

Figure 13A:
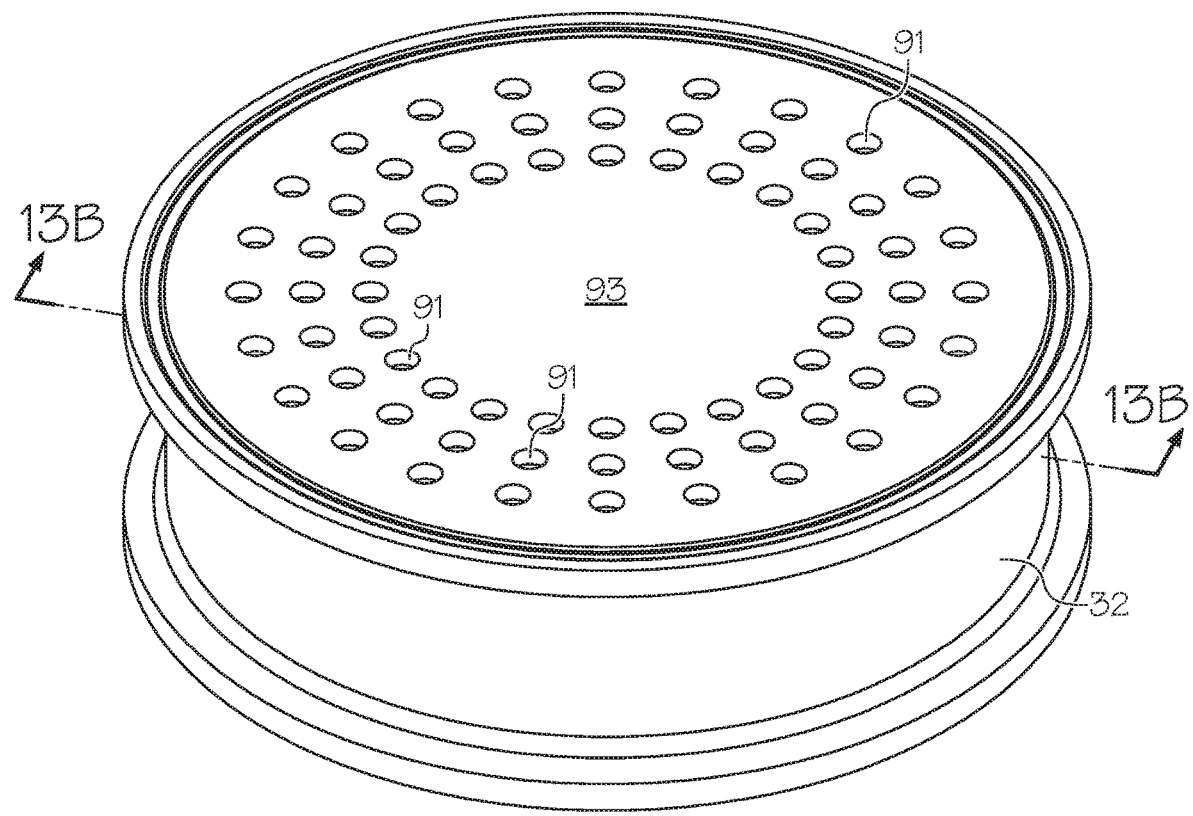
FIG. 13A is a perspective view of a schematic diagram of an embodiment of a diffuser as described herein.
Figure 13B:
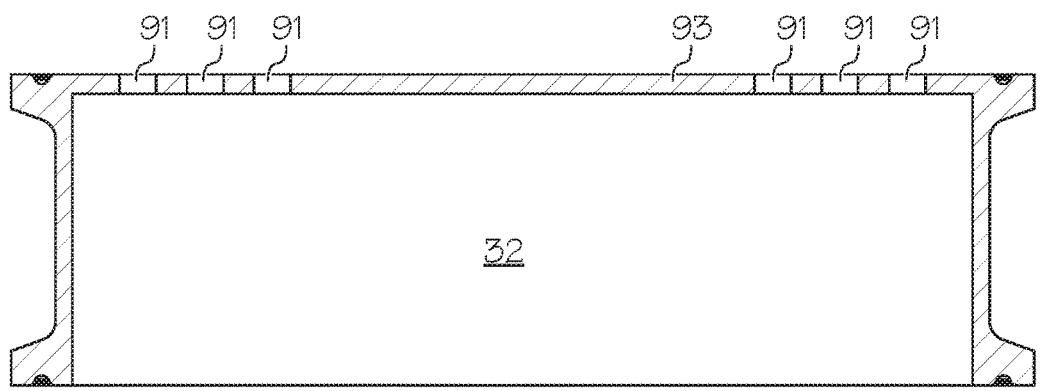
FIG. 13B is a cross-sectional view of the embodiment of the diffuser taken along line 13B-13B of FIG. 13A.

A common problem with extraction systems in which biomass is loaded in a cylindrical extraction device is that the high pressure solvent stream tends to cause a channeling effect. Channeling occurs when the extraction solvent bores a hole through the center of the biomass and is not evenly distributed over the entire surface area of the biomass. As seen in FIGS. 13A and 13B, a solvent diffuser 27 may include a plurality of diffusion apertures 91. In one or more embodiments, the solvent diffuser 27 does not include center diffusion apertures 91, leaving a central guard portion 93 near the center of the solvent diffuser 27. The solvent diffuser 27 may be housed near the top of the extraction device 46 and may substantially evenly distribute the extraction solvent to reduce the channeling effect described above.

Figure 14:
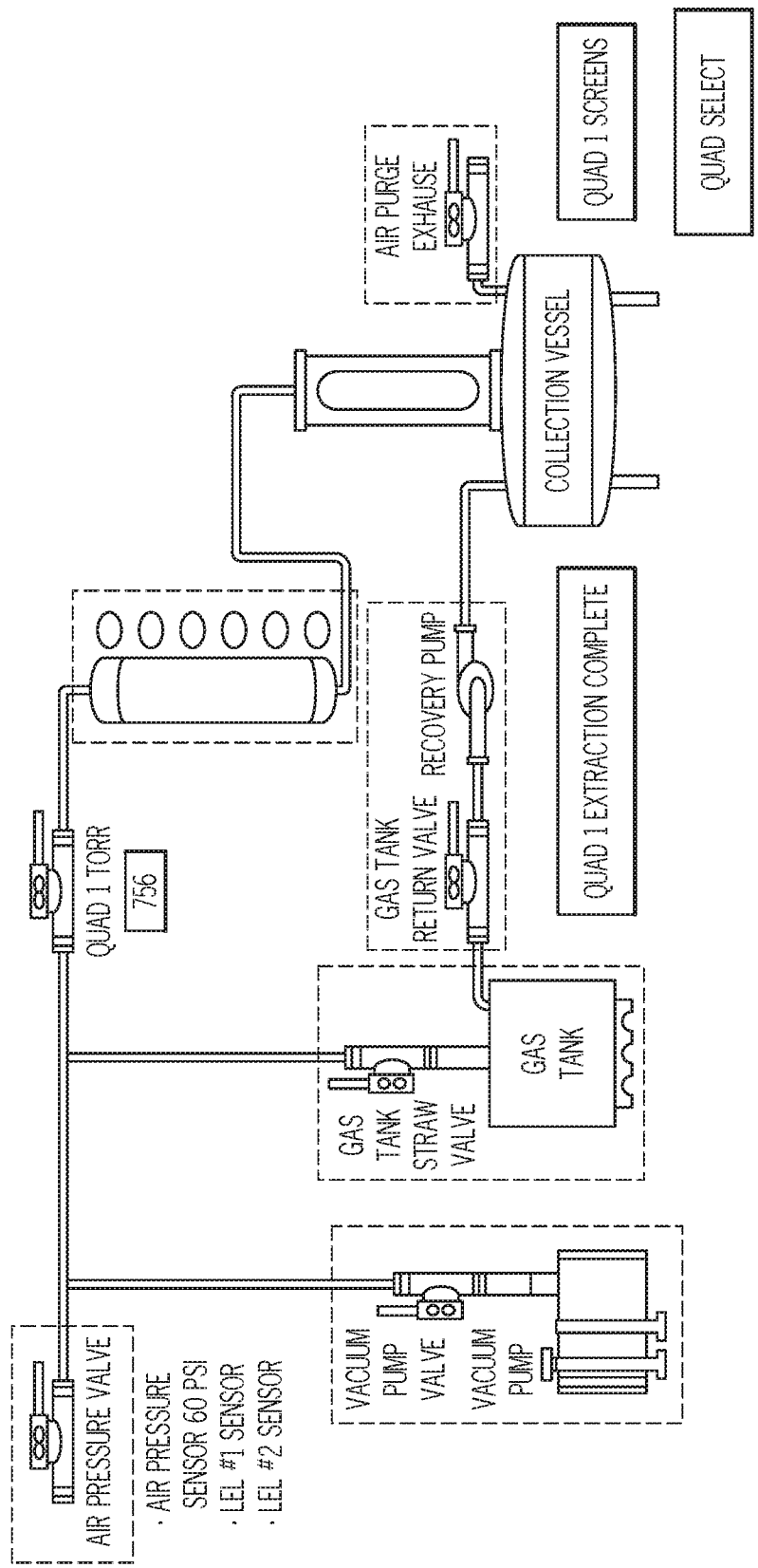
FIG. 14 is an exemplary home screen displayed on an embodiment of the user interface as described herein.

FIG. 14 illustrates an exemplary home screen displayed on the user interface 23 of the PLC computer 22 for the system status of Quadrant 1 (See FIG. 3). The PLC computer 22 may control a plurality of independent extractions simultaneously. The status of each independent extraction system 10 may be depicted with some unique characteristic, such as color-coded versions of the display shown in FIG. 14. If the PLC computer 22 detects any deviation from the normal operating conditions of the PLC extraction system 20, the region of the PLC extraction system 20 that is experiencing the deviation may be highlighted on the display.

For visual monitoring, dual-sight glasses may be included on all weldments. In dual-sight glass monitoring systems, a light is shown through one glass and the other glass is used for viewing. In one or more embodiments, the two glass may be arranged perpendicular to one another for optimal lighting.

Figure 15A:
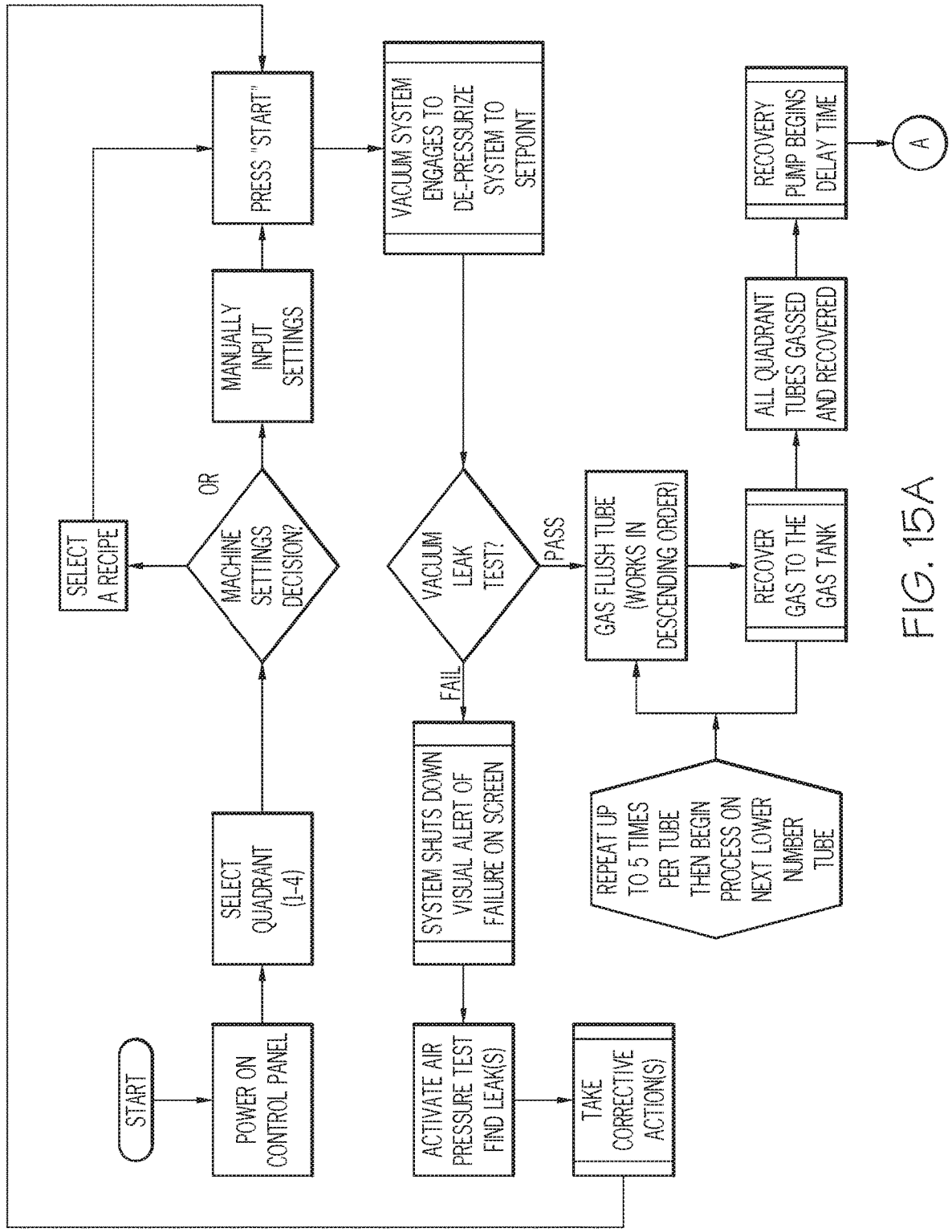
FIG. 15A is a flow chart of an embodiment of the extraction process as described herein.
Figure 15B:
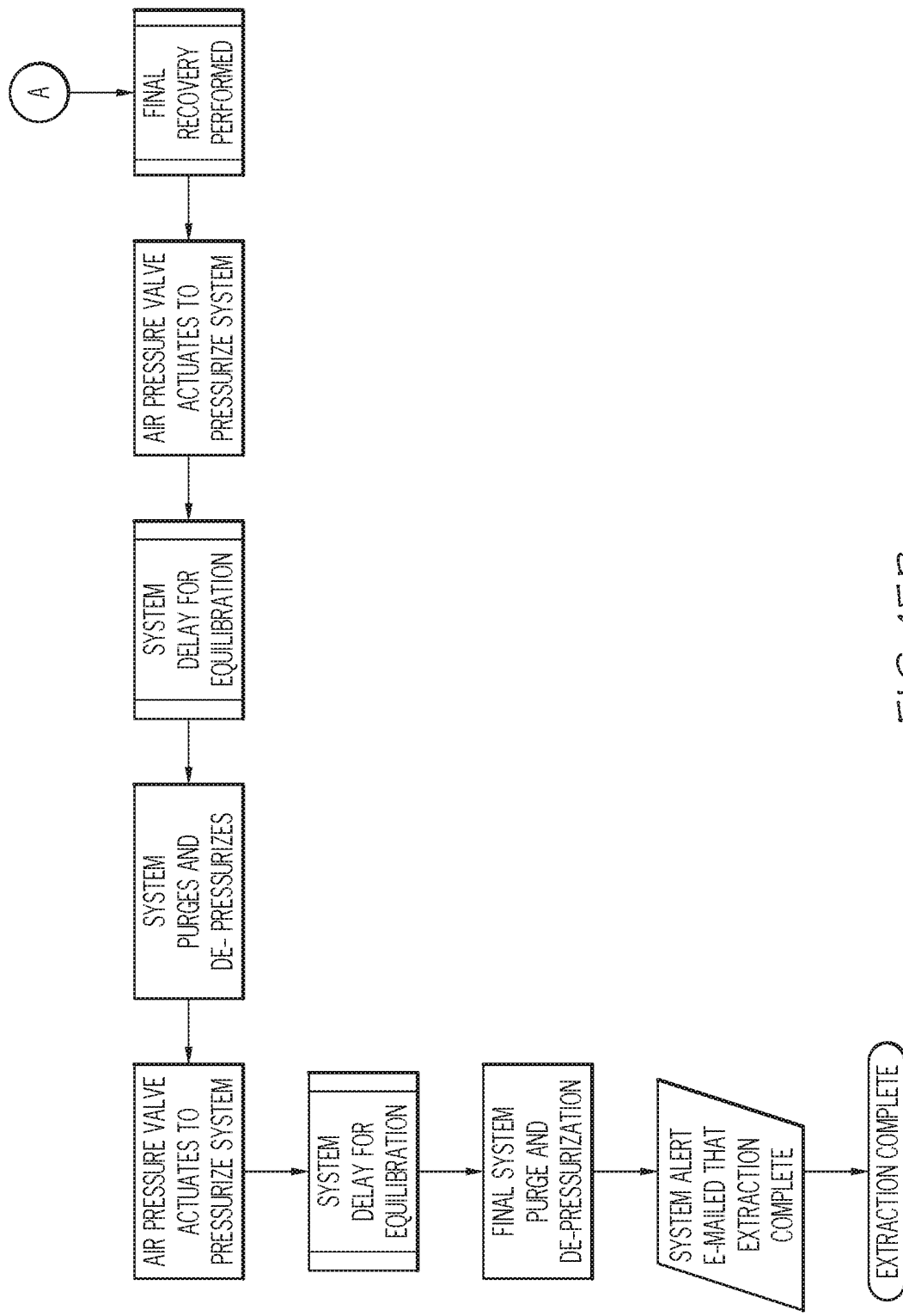
FIG. 15B is a continuation of the flow chart of FIG. 15A.

FIGS. 15A and 15B show a typical extraction protocol in the form of a flow chart. Beginning at "Start" on FIG. 15A, the PLC extraction system is powered on at the control panel. Then, when multiple quadrants are used, as shown in FIG. 3, the appropriate quadrant is selected, as are the appropriate system settings. The system settings may be selected as a pre-programmed recipe or as a series of manual inputs. Once the system settings are selected, an option to start the PLC extraction will appear. First, the vacuum system will be engaged to depressurize to a preset pressure, and then the system will perform a vacuum leak test. If a vacuum leak is detected, the entire PLC extraction system 20 will shut down and the operator will receive a visual and/or an audible alert of the failure. The PLC extraction system 20 may then be pressurized to detect the leak. Once the vacuum leak is corrected, the option to start the PLC extraction will appear once again, and the vacuum leak test will be performed. Once the vacuum leak test is successful, each extraction device 46 is purged with the extraction solvent, and the solvent is recovered to the solvent reservoir 36, as described above. Each of the extraction devices 46 are purged in this manner, the extracts are obtained, and then the recovery pump 38 begins a preset delay time. This delay time allows recovery of a major portion of the residual solvent trapped in the extract. While in the delay time, the extract is held at slightly elevated temperatures, allowing any residual solvent to escape the extract. The pressure within the extraction device 46 then increases. As the recovery pump 38 begins operation after the delay time, thereby lowering the pressure within the extraction device 46, the previously trapped solvent can be recovered, rather than vented to the atmosphere.

As shown in FIG. 15B, after the final recovery, the PLC extraction system 20 is pressurized, allowed to equilibrate, and then purged with the purging gas and depressurized. This purge and equilibration cycle may occur more than once. Once the PLC extraction system has undergone a final purge and depressurization, the operator is notified that the extraction is complete.

Various safety measures may be added to the PLC extraction system 20 and controlled by the PLC computer 22. As described above, a sensor system may monitor unsafe levels of solvent gases in the air, and the sensors may also be integrated into the exhaust fans. Other safety measures include, but are not limited to, a log of all events, programmable recipes for repeatable extractions, pressure tests to uncover leaks in the system, and a recovery protocol if the PLC extraction system 20 shuts down with solvent remaining in the system (e.g., the solvent must be recovered before an operator can open the system to begin another extraction).

Small amounts of solvent may be lost between extractions when the PLC extraction system 20 is disassembled and the biomass is replenished. A semi-automated process may refill the lost solvent between extraction sequences. Thus, an operator can add LPG solvent through solvent inlet 37 to recharge the solvent reservoir and avoid moving the heavy solvent reservoir to a designated outside zone for transfilling operations.

Other functions may allow a user to manually control each flow interrupter 39 or components of the recovery pump 38. Counters on the flow interrupters 39 may show the number of open/close cycles performed by the flow interrupter 39, and the operator may thus determine when flow interrupters 39 must be replaced or undergo preventative maintenance. The user interface 23 may also be used to provide schematics of the PLC extraction system 20 to identify malfunctioning components and replacement parts needed or to diagnose malfunctions of the overall system.

Further, technicians may be able to help diagnose problems remotely without physically being present. The system may be monitored remotely through a smart device or computer. In such embodiments, system parameters are sent after each extraction, and the operator is notified in the event of unsafe operating conditions or extraction completion. The PLC computer 22 also enables data analytics illustrating operating efficiency.

The claimed subject matter is not limited in size and may be constructed in miniature versions or for use in very large-scale applications in which the same or similar principles as described above would apply. Furthermore, the figures (and various components shown therein) of the specification are not to be construed as drawn to scale. The PLC extraction system 20 may be computer-controlled, not requiring a human operator to open/close flow interrupter 39, or to turn on/off electrical components such as vacuum pumps and refrigerant recovery pumps, and the computer may be constantly monitoring conditions for safe and efficient operation.

FIGS. 1-15 illustrate an embodiment of a PLC extraction system 20 in which the features described above may be implemented. These FIGS. should not be considered as limiting the scope of the disclosure or usefulness of the features described herein. In this example, the PLC extraction system 20 can include a computer or computing device having one or more processors (CPUs), memory, and other components typically present in general purpose computing devices.

Any of the embodiments described with reference to the FIGS. may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices. More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another. The embodiments disclosed herein, may be implemented as a computer process (method), a computing system, or as an article of manufacture, such as a computer program product or non-transitory computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

The memory of the computing device can store information accessible by the one or more processors, including instructions that can be executed by the one or more processors. The memory can also include data that can be retrieved, manipulated or stored by the one or more processors. The memory can be of any non-transitory type capable of storing information accessible by the one or more processors, such as a solid-state hard drive (SSD), disk based hard-drive, memory card, ROM, RAM, DVD, CD-ROM, Blu-Ray, write-capable, and read-only memories.

The one or more processors can be any conventional processor, such as a commercially available CPU produced by INTEL, ARM, and AMD. Alternatively, the processors can be dedicated components such as an application specific integrated circuit ("ASIC"), a system on chip ("SOC"), field programmable gate array (FPGA), or other hardware-based processor.

The data can comprise any information sufficient to identify relevant information including, but not limited to, numbers, descriptive text, proprietary codes, pointers, references to data stored in other memories, or information that is used by a function to calculate the relevant data.

The instructions can be any set of instructions to be executed directly, such as machine code, or indirectly, such as scripts, by the one or more processors. In that regard, the terms "instructions," "application," "steps," and "programs" can be used interchangeably herein. The instructions can be stored in a proprietary computer language, object code format for direct processing by the one or more processors, or in any other computing device language including scripts or collections of independent source code modules that are interpreted on demand or compiled in advance. Functions, methods, and routines of the instructions are explained in more detail above. Based on the instructions, the processor(s) may then transmit signals to various components of the PLC extraction system 20.

Data may be retrieved, stored or modified by the one or more processors in accordance with the instructions. For instance, although the subject matter described herein is not limited by any particular data structure, the data can be stored in computer registers, in a relational or non-relational database as a table having many different fields and records, or XML documents.

The computing device may include a compiler which may compile the data and instructions from a first format into a device-readable format. For example, the compiler may receive instructions in a proprietary computer language or a programming language (e.g., Java, C #, C, C++, Basic, Fortran, etc.) and convert the instructions into a device-readable format such as, but not limited to, binary values, ASCII, or Unicode.

Although the computing device may have a microcontroller including one or more processors (as well as memory, and other components that are not shown) may be within the same housing, e.g. the PLC computer 22, the one or more processors, memory, and other components can actually comprise multiple processors, memories, and other components that may or may not be stored within the same physical housing. Accordingly, references to a processor, memory, or other elements will be understood to include references to more than one processor, memory, or other elements that may or may not operate in parallel. Additionally, the computing device can be comprised of more than one computing device.

Throughout this specification the word "comprise", or variations such as "comprises" or "comprising," will be understood to imply the inclusion of a stated element, integer, or step, or group of elements, integers, or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "front," "rear," "left," "right," "inner," "outer," "beneath," "below," "lower," "above," "upper," "horizontal," "vertical," and the like, may be used herein for ease of description to describe one element or feature's relationship to another element or feature, as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

It is noted that one or more of the following claims utilize the term "wherein" as a transitional phrase. For the purposes of defining the present subject matter, it is noted that this term is introduced in the claims as an open-ended transitional phrase that is used to introduce a recitation of a series of characteristics of the structure and should be interpreted in like manner as the more commonly used open-ended preamble term "comprising."

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A computer-controlled programmable logic controller (PLC) extraction system for separating an extract from a biomass, comprising:
   a PLC;
   a solvent reservoir comprising a solvent that is a gas when the solvent is at a temperature of 25° C. and atmospheric pressure;
   a plurality of extraction devices comprising the biomass;
   an extract collection reservoir for collecting the extract;
   a solvent recovery system; and
   a temperature-controlled circulation system, the circulation system fluidly connecting the solvent reservoir, the plurality of extraction devices, the extract collection reservoir, and the solvent recovery system;
   wherein:
   the temperature-controlled circulation system comprises at least one pneumatically controlled apparatus for controlling a flow of the solvent; and
   the solvent comprises no more than 1 weight % $CO_2$.

2. The computer-controlled PLC extraction system of claim 1, wherein the at least one apparatus for controlling the flow of the solvent is a pneumatically controlled ball valve.

3. The computer-controlled PLC extraction system of claim 1, wherein the solvent is selected from the group consisting of ethane, propane, butane, isobutane, 1,1,1,2-tetrafluoroethane, dimethyl ether, methyl ethyl ether, and a mixture of two or more of these.

4. The computer-controlled PLC extraction system of claim 3, wherein the solvent is propane, butane, isobutane, or a mixture of two or more of these.

5. The computer-controlled PLC extraction system of claim 1, wherein the solvent recovery system comprises a cooling device thermally coupled to the solvent reservoir and the plurality of extraction devices.

6. The computer-controlled PLC extraction system of claim 1, wherein the PLC is contained in a first compartment and the solvent reservoir, the plurality of extraction devices, the extract collection reservoir, and the solvent recovery system are all contained in a second compartment different from the first compartment, the first compartment and the second compartment being fluidly coupled by the temperature-controlled circulation system.

7. The computer-controlled PLC extraction system of claim 1, wherein the extract collection reservoir comprises a collection pan for mixing of a second solvent with the extract for post-processing and further purification of the extract.

8. The computer-controlled PLC extraction system of claim 1, wherein the plurality of extraction devices comprise a solvent inlet, the solvent inlet comprising a diffuser.

9. The computer-controlled PLC extraction system of claim 1, further comprising a vacuum fluidly connected to the PLC, the solvent reservoir, the plurality of extraction devices, the extract collection reservoir, the solvent recovery system, and the temperature-controlled circulation system.

10. The computer-controlled PLC extraction system of claim 1, further comprising an evaporator having an inlet fluidly connected to the plurality of extraction devices and an outlet fluidly connected to the extract collection reservoir.

11. The computer-controlled PLC extraction system of claim 10, wherein the evaporator comprises a plurality of evaporation channels arranged from the inlet to the outlet along a major axis of the evaporator.

12. A method of extracting an extract from a biomass, the method comprising:
providing the biomass to a computer-controlled programmable logic controller (PLC) extraction system comprising:
a PLC;
a solvent reservoir comprising a solvent that is a gas when the solvent is at a temperature of 25° C. and atmospheric pressure, the solvent comprising no more than 1 weight % $CO_2$;
a plurality of extraction devices comprising the biomass;
an extract collection reservoir for collecting the extract;
a solvent recovery system; and
a temperature controlled circulation system, the circulation system fluidly connecting the solvent reservoir, the plurality of extraction devices, the extract collection reservoir, and the solvent recovery system;
wherein the temperature controlled circulation system comprises at least one pneumatically controlled apparatus for controlling a flow of the solvent;
circulating the solvent through the temperature controlled circulation system to produce a mixture of the extract and the solvent, the temperature controlled circulation system being pneumatically controlled;
separating the solvent from the extract;
collecting the extract; and
returning at least a portion of the solvent to the solvent reservoir.

13. The method of claim 12, further comprising:
purging the PLC extraction system prior to the circulating the solvent.

14. The method of claim 13, wherein the purging comprises applying a purging gas to the PLC extraction system and applying a vacuum to the PLC extraction system.

15. The method of claim 14, wherein the purging gas is selected from the group consisting of compressed air, $N_2$, $CO_2$, He, Ar, Ne, Kr, Xe, Rn, and mixtures of two or more of these.

16. The method of claim 14, wherein the applying the inert gas and the applying the vacuum are each performed more than once.

17. The method of claim 14, further comprising testing whether the PLC extraction system can maintain the vacuum.

18. The method of claim 17, further comprising deactivating automatically the PLC extraction system if the PLC extraction system cannot maintain the vacuum or if the PLC extraction system detects at least a threshold concentration of hydrocarbons in an environment of the PLC extraction system.

* * * * *